(12) United States Patent
Choi et al.

(10) Patent No.: US 12,494,084 B2
(45) Date of Patent: Dec. 9, 2025

(54) APPARATUS AND METHOD FOR SUPPORTING LEARNING

(71) Applicant: WOONGJIN THINKBIG CO., LTD., Paju-si (KR)

(72) Inventors: Samrak Choi, Paju-si (KR); Uiyoung Kim, Paju-si (KR); Geumbum Lee, Paju-si (KR); Minkyu Ryu, Paju-si (KR)

(73) Assignee: WOONGJIN THINKBIG CO., LTD., Paju-si (KR)

( * ) Notice: Subject to any disclaimer, the term of this patent is extended or adjusted under 35 U.S.C. 154(b) by 476 days.

(21) Appl. No.: 18/086,504

(22) Filed: Dec. 21, 2022

(65) Prior Publication Data

US 2023/0196833 A1   Jun. 22, 2023

(30) Foreign Application Priority Data

Dec. 21, 2021   (KR) .................. 10-2021-0183346

(51) Int. Cl.
*G06V 40/16* (2022.01)
*A61B 5/024* (2006.01)
*G09B 19/00* (2006.01)

(52) U.S. Cl.
CPC .......... *G06V 40/174* (2022.01); *A61B 5/024* (2013.01); *G09B 19/00* (2013.01)

(58) Field of Classification Search
None
See application file for complete search history.

(56) References Cited

FOREIGN PATENT DOCUMENTS

| KR | 10-2009-0092642 A | 9/2009 | |
|----|----|----|----|
| KR | 10-2019-0078929 A | 7/2019 | |
| KR | 20190078929 A * | 7/2019 | ............ A47B 95/00 |
| KR | 10-2179957 B1 | 11/2020 | |
| KR | 10-2020-0144890 A | 12/2020 | |
| WO | WO-2020068132 A1 * | 4/2020 | ............ G06F 3/017 |

OTHER PUBLICATIONS

KR Office Action dated Sep. 22, 2022 as received in Application No. 1020210183346.

* cited by examiner

*Primary Examiner* — Helen Zong
(74) *Attorney, Agent, or Firm* — Maschoff Brennan

(57) ABSTRACT

Proposed are a system and a method for supporting learning, which can increase learning attitudes and efficiency by determining a learning state of a learner by using learner's bio information and face recognition information and providing a feedback of lighting color, incense spray, and music output based on the learning state. The proposed system for supporting learning configures the learning state including a bio state and a learning focus based on the learner's bio information and the face recognition information during learning, and provides, to the learner, at least one feedback of lighting color change, illuminance change, incense spray, and sound source playback in accordance with the learning state.

15 Claims, 14 Drawing Sheets

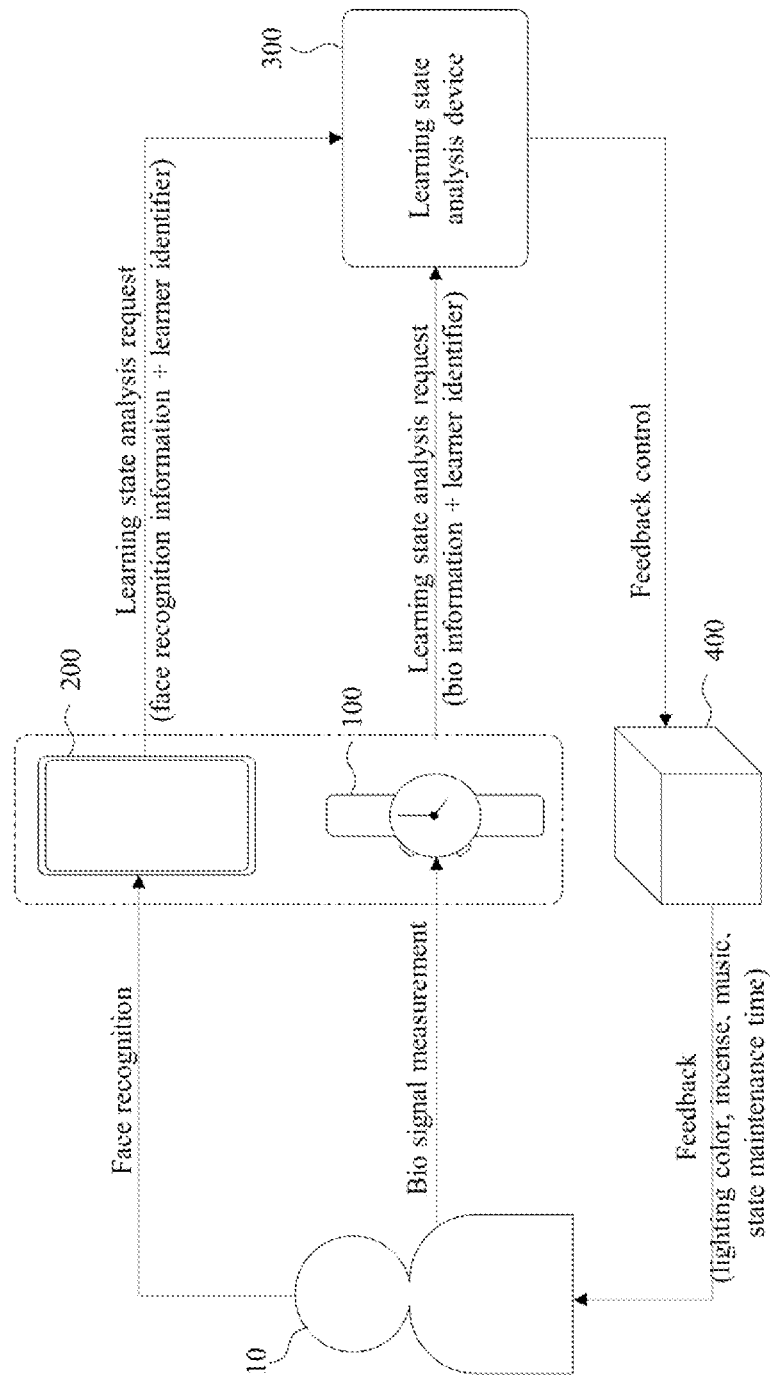
[FIG. 1]

[FIG. 2]
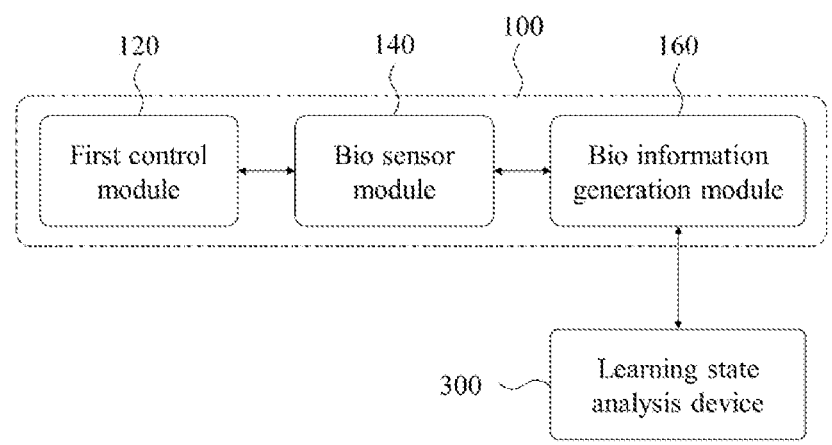
[FIG. 3]
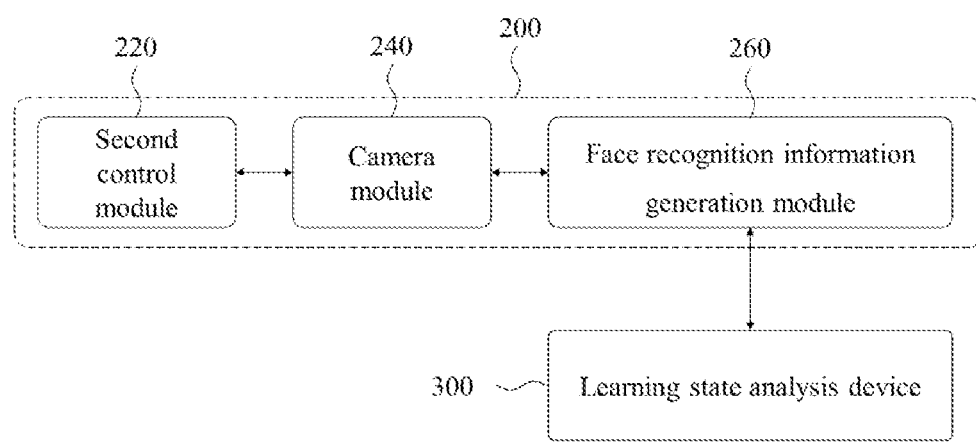

[FIG. 4]
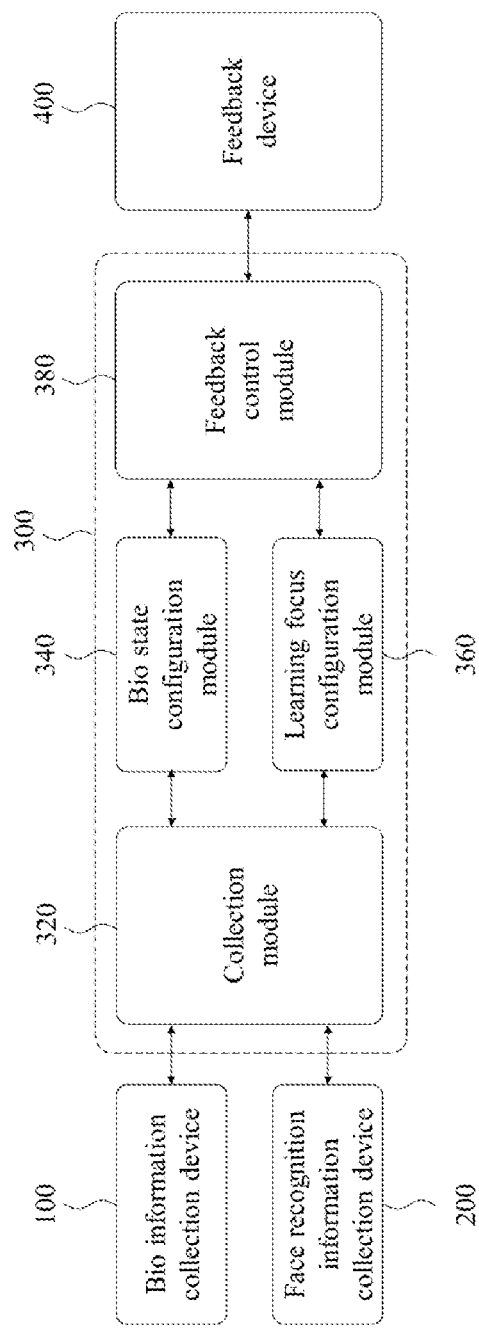

[FIG. 5]
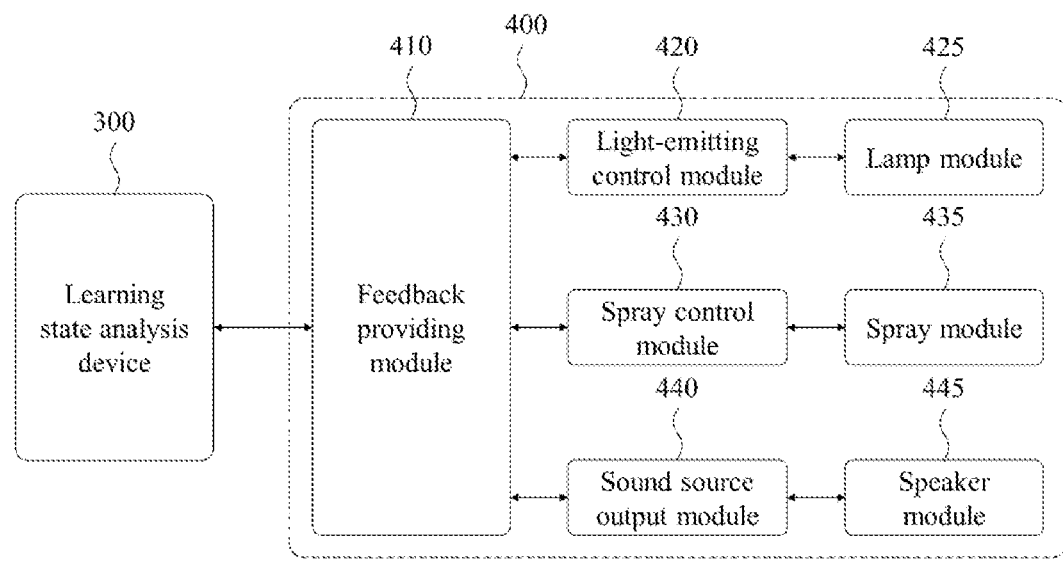
[FIG. 6]
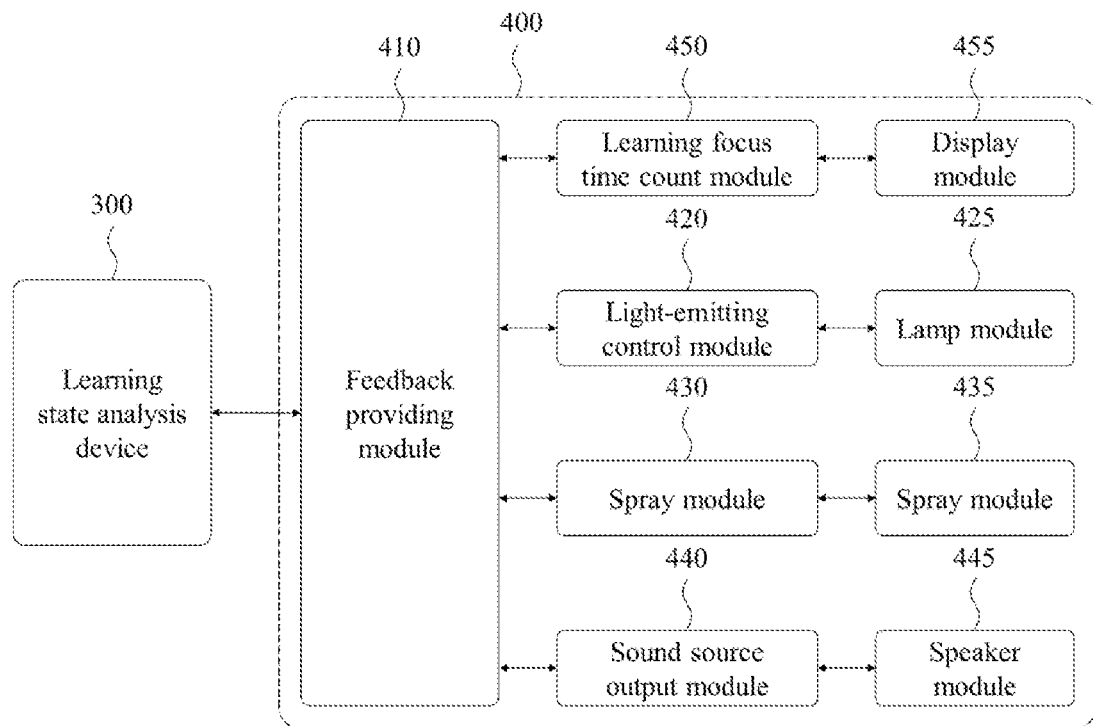

[FIG. 7]
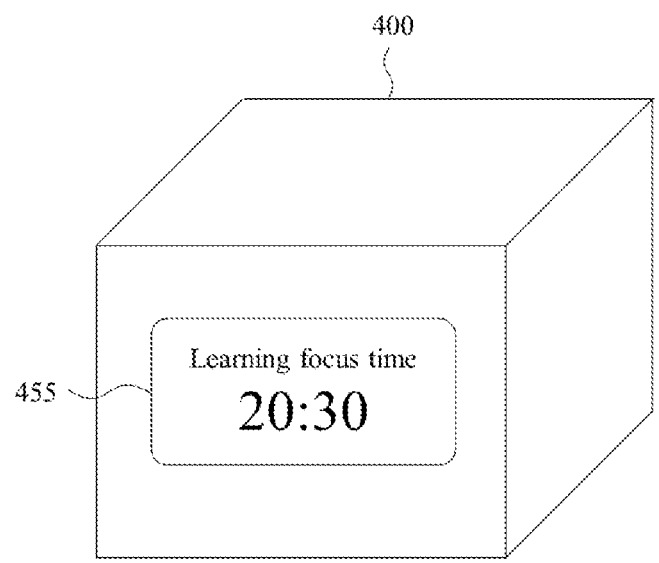

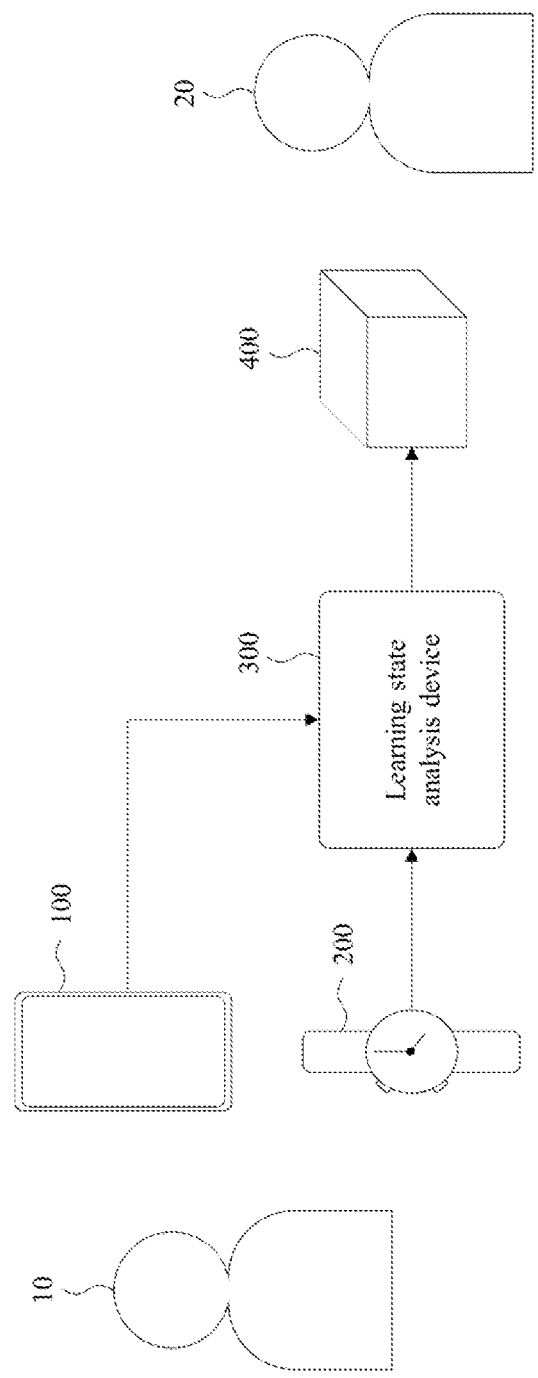

[FIG. 9]
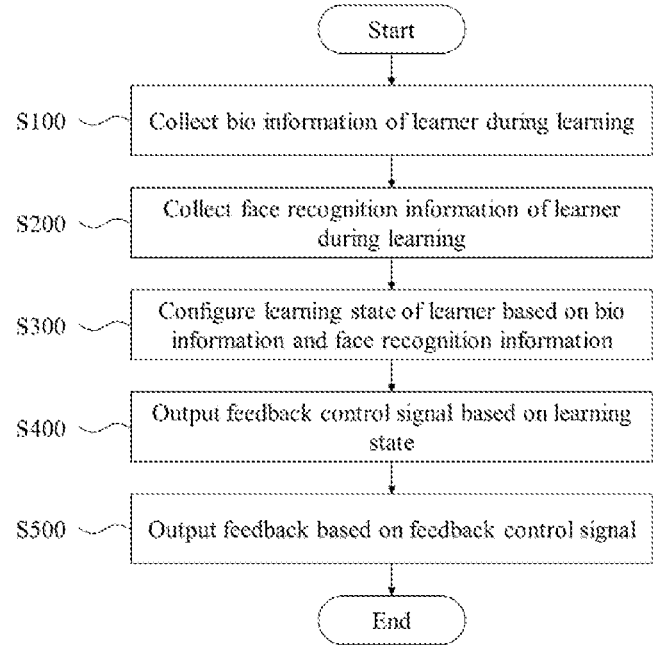
[FIG. 10]
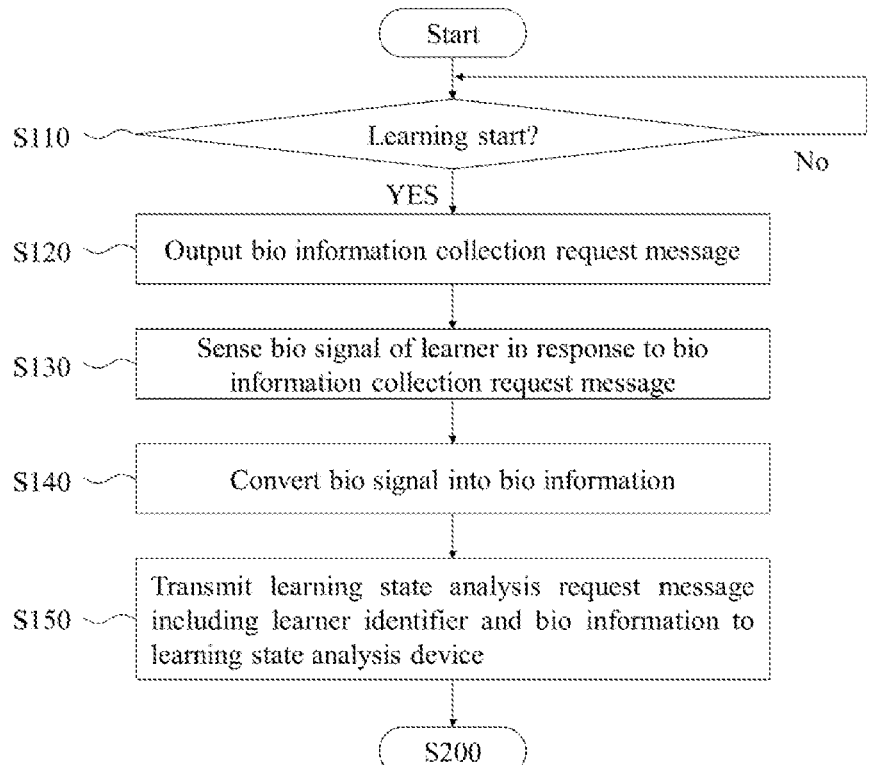

[FIG. 11]
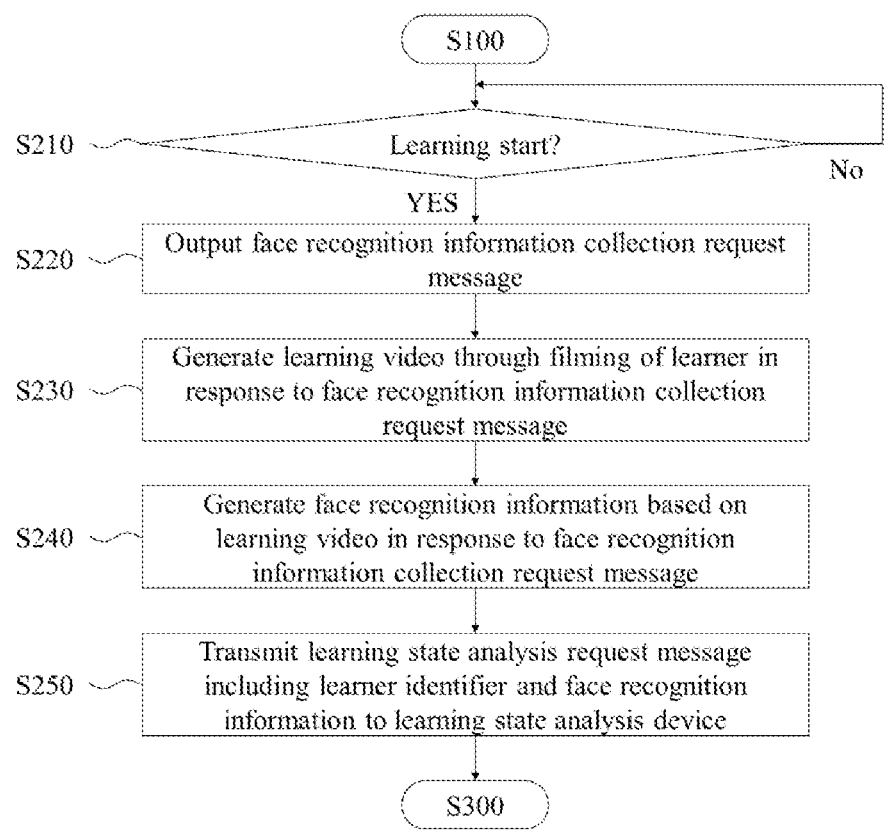

[FIG. 12]
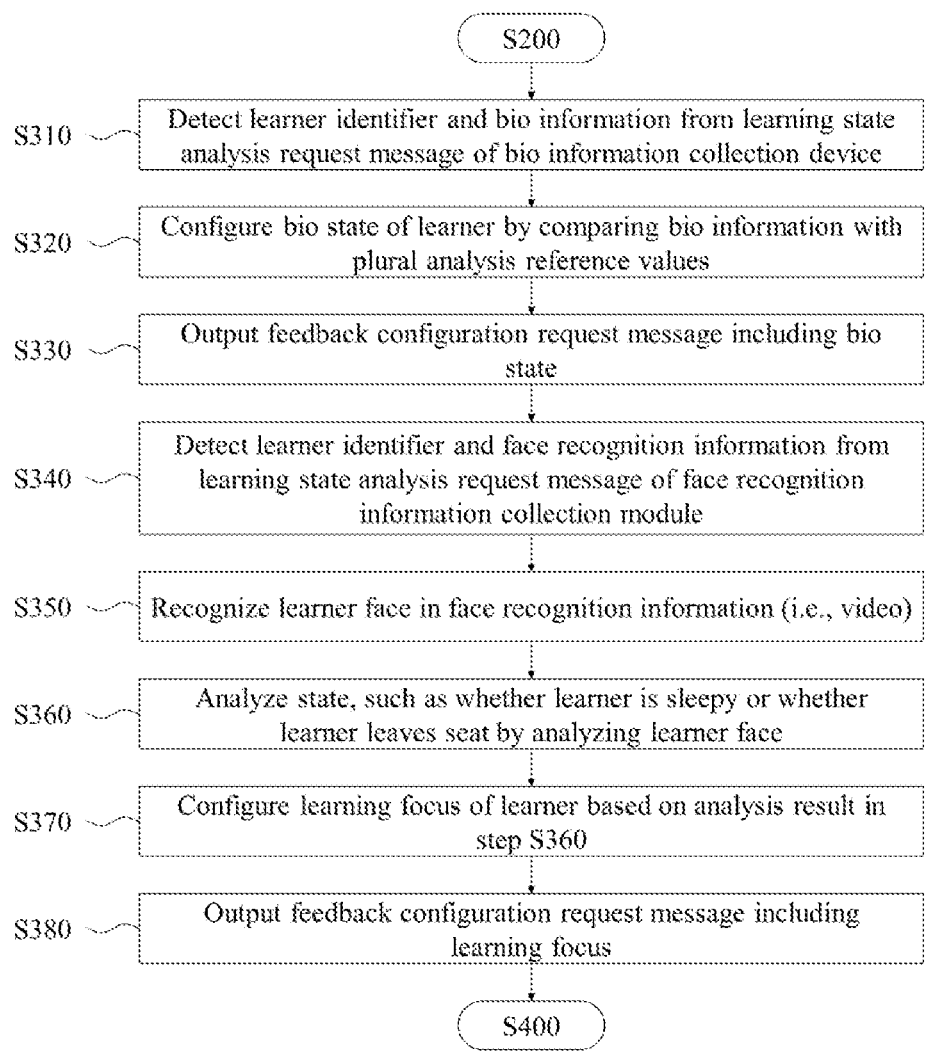

[FIG. 13]
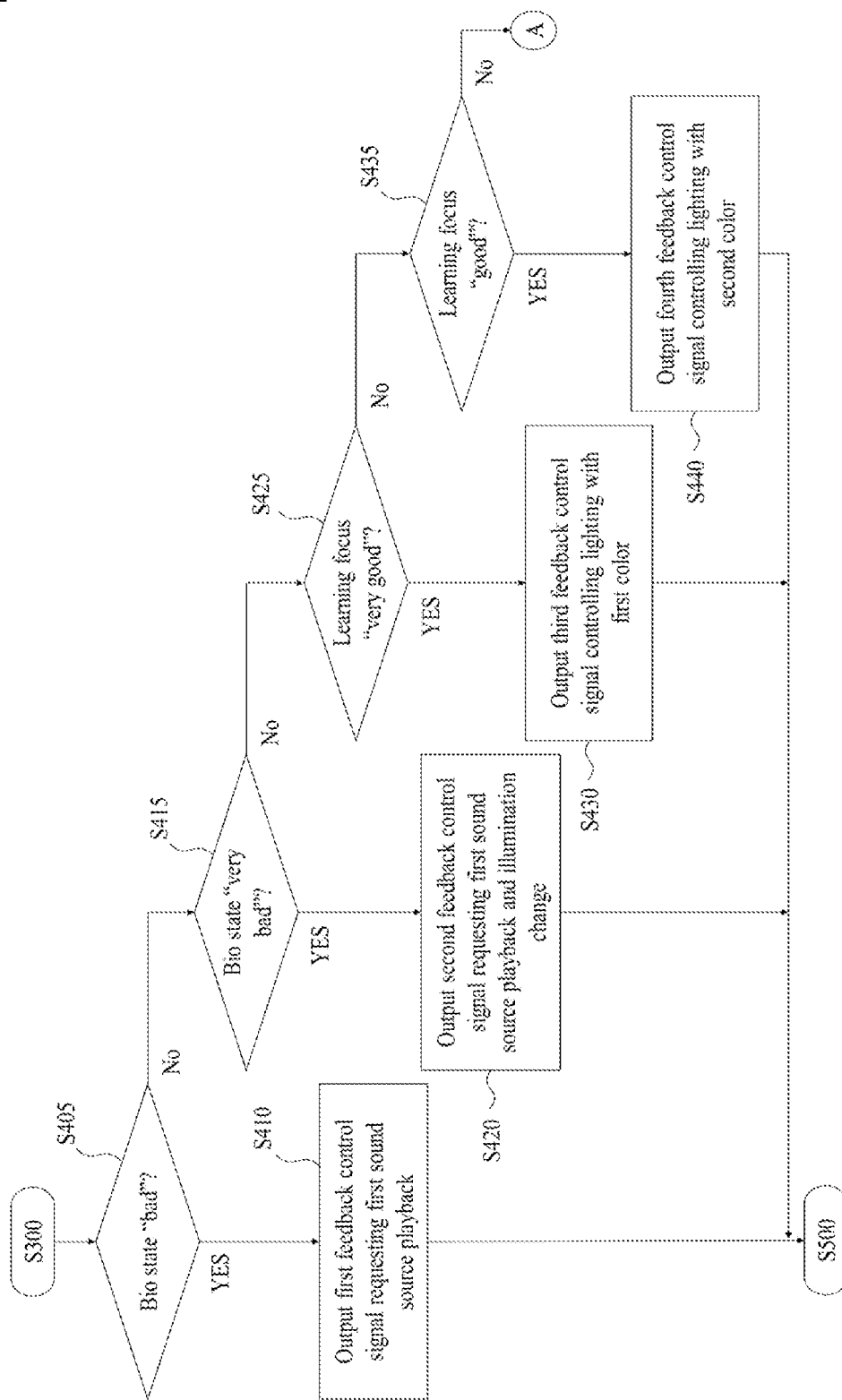

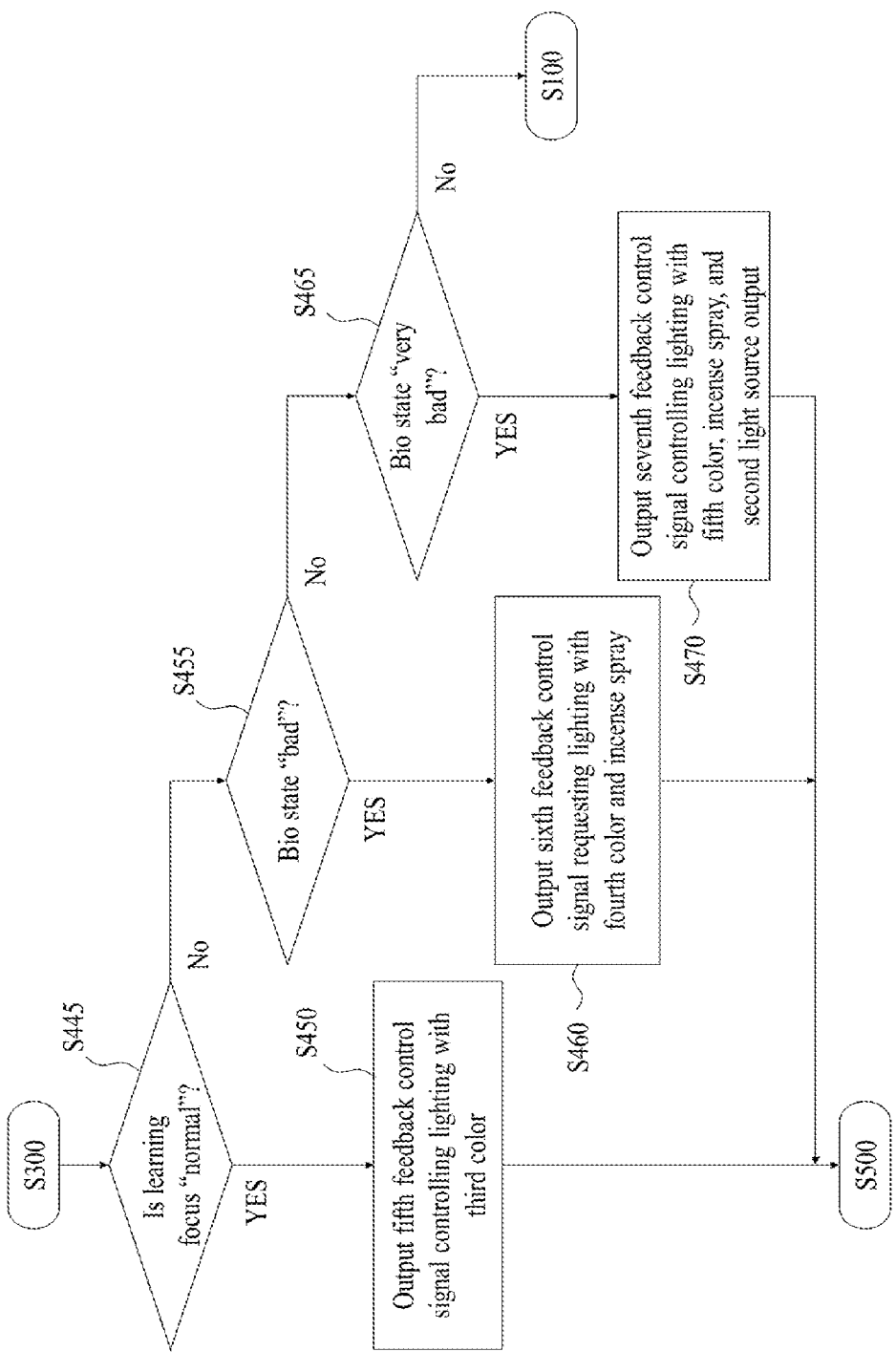
[FIG. 14]

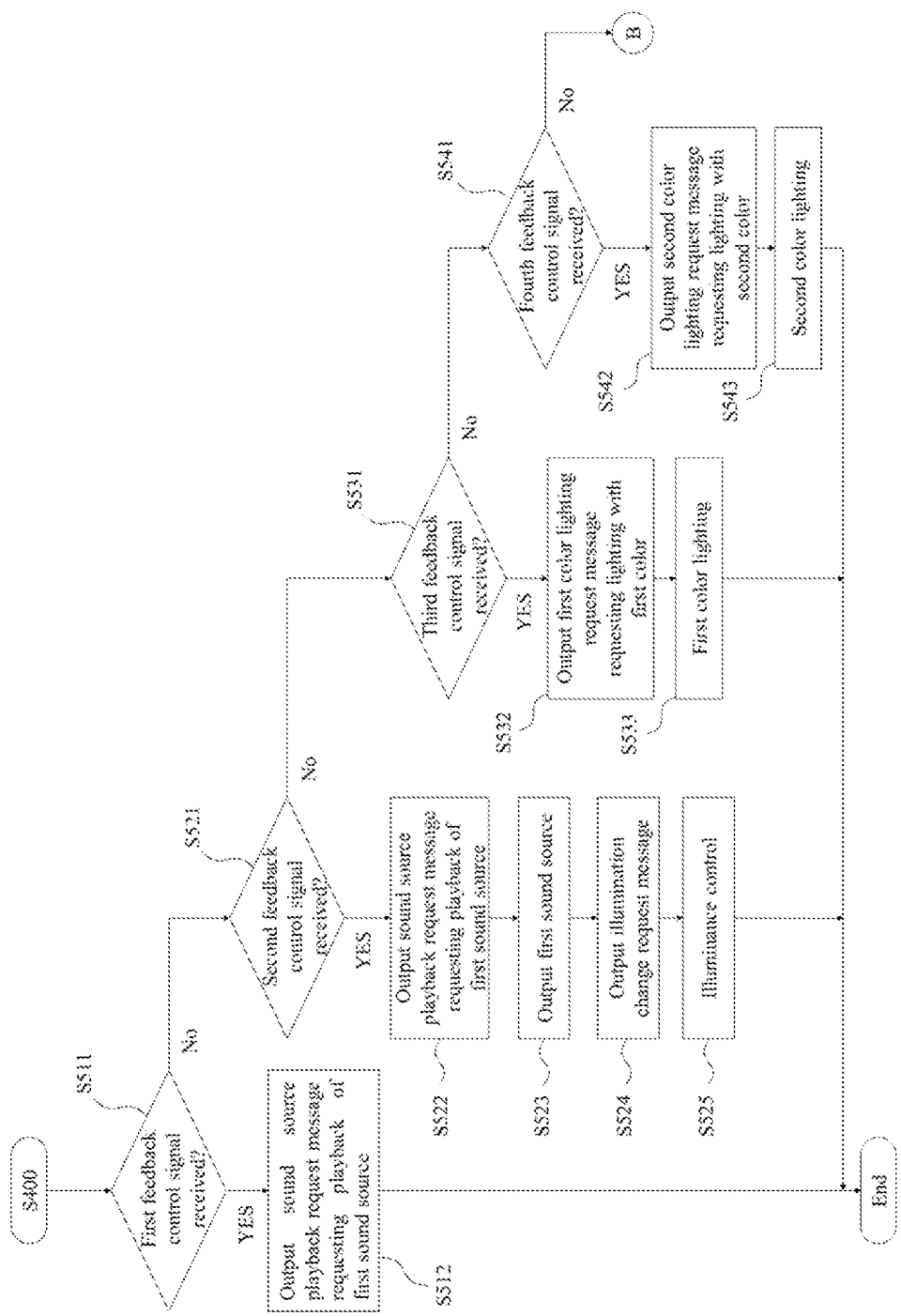
[FIG. 15]

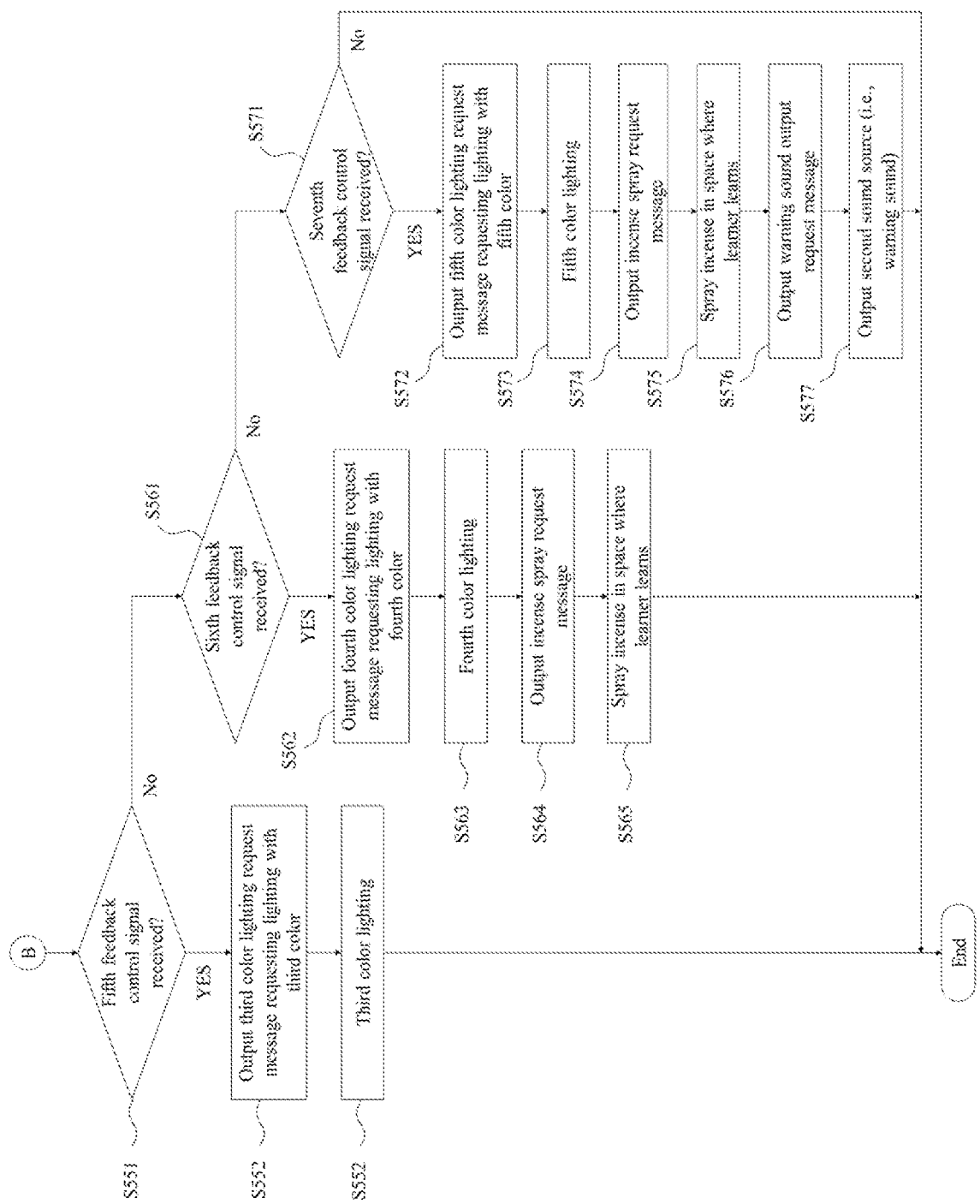
[FIG. 16]

[FIG. 17]
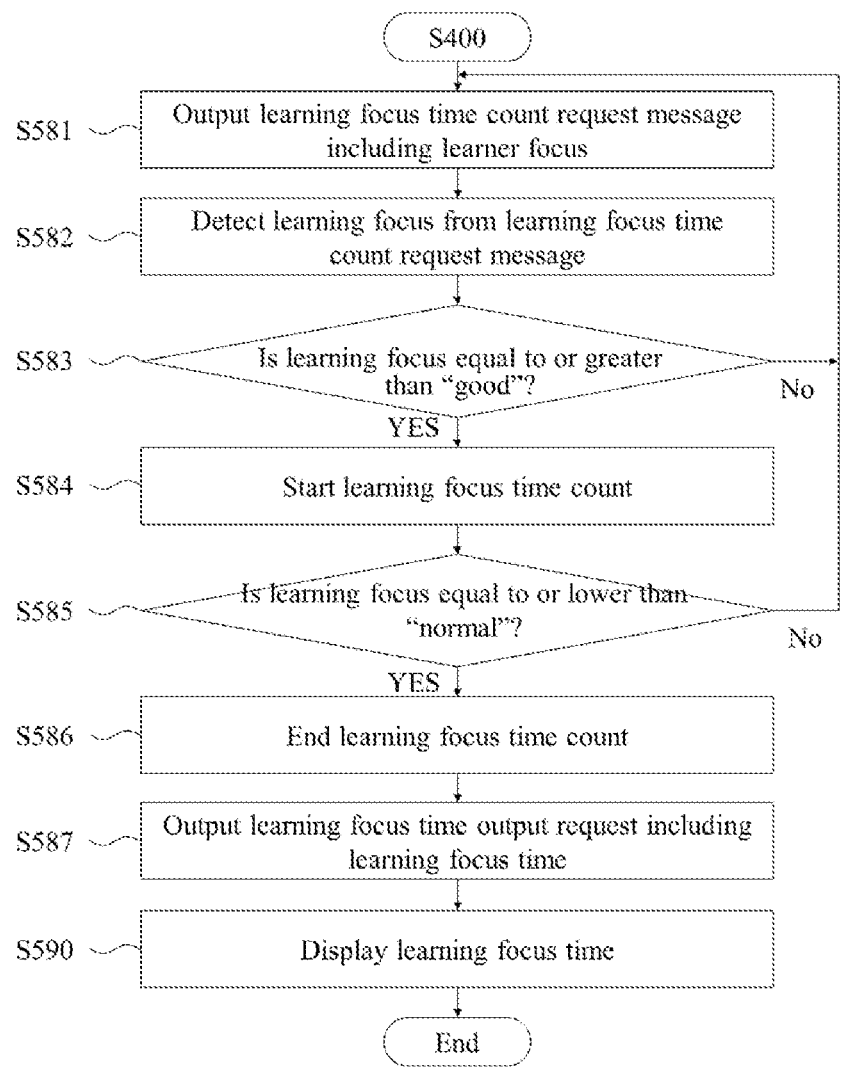

APPARATUS AND METHOD FOR SUPPORTING LEARNING

TECHNICAL FIELD

The present disclosure relates to a system and a method for supporting learning, which monitor a learning state of a learner and provide a feedback in accordance with the result of monitoring.

BACKGROUND ART

Various learning state monitoring technologies for inducing a learner to focus on learning have been developed. As an example, there is a learning state monitoring technology that displays the state of a learner by collecting and analyzing bio information of the learner.

The learning state monitoring technology in the related art is merely to the extent of simply notifying a learner that the learner does not focus on learning by exposing a notification screen on a learning device in case that the learner is in a state where the learner is unable to focus on the learning or the learning has a problem. In the learning state in the related art, the monitoring technology stores focusing on the learning, learning time, and the like, and provides information on the learning on a separate menu of the learning device. The learner utilizes the learning information of the learner in order to improve the learning state by analyzing the learning information after the learning.

That is, the learning state monitoring technology in the related art is to notify the learner that the learner is not focusing on the learning by simply outputting a notification sound or a notification screen in case that a problem occurs in the learning state of the learner, and thus is merely to the extent of notifying the learner of the current situation rather than the purpose of improving the current situation of the learner.

If a solution for solving the current problematic situation is not provided, immediate learning state improvement is unable to be performed, and thus it is difficult to proceed with an efficient learning. Further, since considering of a method for improving learning habits by identifying and analyzing the learning information of the learner in a separate menu after the learning is not improvement by an immediate feedback during the learning, it is difficult to effectively improve the learning habits.

Recently, developments has been made in the direction of improving the learning attitude and increasing the efficiency of the learning by giving a feedback so that the learner can further focus on the learning through analysis of the learning attitude of the learner with a camera or a smart device. For example, if a problem occurs in the learning state of the learner, a notification is given to the learning device.

The matters described in the above background technology are to help understanding of the background of the present disclosure, and may include the matters that are not the disclosed technology in the related art.

PRIOR ART DOCUMENT (Patent document) Korean Registered Patent No. 10-2179957

DISCLOSURE

Technical Problem

The present disclosure has been proposed in consideration of the above-described circumstances, and an object of the present disclosure is to provide a system and a method for supporting learning, which can increase learning attitudes and efficiency by determining the learning state of a learner by using learner's bio information and face recognition information and providing a feedback of lighting color, incense spray, and music output based on the learning state.

Technical Solution

According to an embodiment of the present disclosure for achieving the above object, an apparatus for supporting learning includes: a bio information collection device configured to: collect bio information of a learner during learning, and output a learning state analysis request message including the bio information; a face recognition information collection device configured to: collect face recognition information of the learner, and output a learning state analysis request message including the face recognition information; a learning state analysis device configured to: configure a bio state of the learner based on the bio information detected from the learning state analysis request message in response to the learning state analysis request message of the bio information collection device, configure a learning focus of the learner based on the face recognition information detected from the learning state analysis request message in response to the learning state analysis request message of the face recognition information collection device, and output a feedback control signal based on a learning state including the bio state and the learning focus; and a feedback device configured to output at least one feedback among a lighting color change, an illuminance change, an incense spray, and a sound source playback in response to the feedback control signal of the learning state analysis device.

The bio information collection device may include: a first control module configured to output a bio information collection request message in case of sensing a learning start of the learner; a bio sensor module configured to: sense a bio signal of the learner in response to the bio information collection request message of the first control module, sense a heart rate of the learner as the bio signal through being composed of a heart rate sensor, and output the bio signal; and a bio information generation module configured to: convert the bio signal output from the bio sensor module into bio information in a data form in response to the bio information collection request message of the first control module, and output the learning state analysis request message including the bio information to the learning state analysis device.

The face recognition information collection device may include: a second control module configured to output a face recognition information collection request message in case of sensing a learning start of the learner; a camera module configured to: generate a learning video by filming the learner in response to the face recognition information collection request message of the second control module, and output a face recognition information generation request message including the learning video; and a face recognition information generation module configured to: detect the learning video from the face recognition information generation request message of the camera module in response to the face recognition information collection request message of the second control module, generate face recognition information by cropping an area in which a face of the learner is disposed from the learning video, and output a learning state analysis request message including the face recognition information to the learning state analysis device.

The learning state analysis device may include: a collection module configured to: output a bio information analysis request message including the bio information detected from the learning state analysis request message in response to the learning state analysis request message of the bio information collection device, and output a face recognition information analysis request message including the face recognition information detected from the learning state analysis request message in response to the learning state analysis request message of the face recognition information collection device; a bio state configuration module configured to: configure one of a plurality of bio steps as the bio state of the learner by comparing the bio information detected from the bio information analysis request message with a plurality of analysis reference values in response to the bio information analysis request message of the collection module, and output a feedback configuration request message including the bio state; a learning focus configuration module configured to: configure a learning focus of the learner based on the face recognition information detected from the face recognition information analysis request message in response to the face recognition information analysis request message of the collection module, and output a feedback configuration request message including the learning focus; and a feedback control module configured to output, to the feedback device, a feedback control signal for controlling at least one feedback operation among the lighting color change, the illuminance change, the incense spray, and the sound source playback in response to at least one feedback configuration request message between the bio state configuration module and the learning focus configuration module.

The bio state configuration module may be configured to: configure first to fourth heart rate set values, and configure the bio state of the learner by comparing a heart rate that is the bio information with the first to fourth heart rate set values, and the bio state configuration module may be configured to: configure the bio state of the learner as a fifth step if the heart rate is equal to or greater than the first heart rate set value, configure the bio state of the learner as a fourth step if the heart rate is less than the first heart rate set value and equal to or greater than the second hear rate set value, configure the bio state of the learner as a third step if the heart rate is less than the second heart rate set value and equal to or greater than the third heart rate set value, configure the bio state of the learner as a second step if the heart rate is less than the third heart rate set value and equal to or greater than the fourth heart rate set value, and configure the bio state of the learner as a first step if the heart rate is less than the fourth heart rate set value.

The learning focus configuration module may be configured to: recognize a learner's face in the face recognition information by performing face recognition with respect to the face recognition information, analyze whether the learner is sleepy or leaves his/her seat by analyzing the learner's face, configure the learning focus based on the result of analysis, and configure one of the first to fifth steps as the learning focus of the learner.

The feedback control module may be configured to: transmit a first feedback control signal for requesting a first sound source playback to the feedback device if the bio state of the learner is a fourth step, transmit a second feedback control signal for requesting the first sound source playback and an illuminance change to the feedback device if the bio state of the learner is a fifth step, transmit a third feedback control signal for requesting a first color lighting to the feedback device if the learning focus of the learner is a first step, transmit a fourth feedback control signal for requesting a second color lighting to the feedback device if the learning focus of the learner is a second step, transmit a fifth feedback control signal for requesting a third color lighting to the feedback device if the learning focus of the learner is a third step, transmit a sixth feedback control signal for requesting a fourth color lighting and incense spray to the feedback device if the learning focus of the learner is a fourth step, and transmit a seventh feedback control signal for requesting a fifth color lighting, incense spray, and a second sound source playback to the feedback device if the learning focus of the learner is a fifth step.

The feedback device may include: a light-emitting control module configured to control a lamp module to control a lighting color and lighting illuminance of a lamp in response to the feedback control signal; a spray control module configured to control a spray module to spray incense into a space in which the learner is located in response to the feedback control signal; a sound source output module configured to output one of a first sound source and a second sound source into the space in which the learner is located through a speaker module in response to the feedback control signal; and a feedback providing module configured to provide at least one feedback among a lighting color change, an illuminance change, an incense spray, and a sound source playback to the learner by outputting the feedback control signal to at least one of the light-emitting control module, the spray control module, and the sound source output module in response to the feedback control signal of the learning state analysis device.

The feedback device may further include: a learning focus time count module configured to: count a learning focus time based on the learning focus of the learner, output a learning focus time output request after starting counting of the learning focus time if the learning focus is a first step or a second step, and end the counting of the learning focus time if the learning focus is changed to one of third to fifth steps after starting the counting of the learning focus time; and a display module configured to display the learning focus time being counted by the learning focus time count module in response to the learning focus time output request of the learning focus time count module.

According to an embodiment of the present disclosure for achieving the above object, a method for supporting learning includes:

collecting, by a bio information collection device, bio information of a learner during learning; collecting, by a face recognition information collection device, face recognition information of the learner; configuring, by a learning state analysis device, a learning state including a bio state of the learner configured based on the bio information collected in the step of collecting the bio information and face recognition information collected in the step of collecting the face recognition information; outputting, by the learning state analysis device, a feedback control signal based on the learning state configured in the step of configuring the learning state; and outputting, by a feedback device, at least one feedback among a lighting color change, an illuminance change, an incense spray, and a sound source playback in response to the feedback control signal.

The collecting of the bio information may include: outputting, by a first control module, a bio information collection request message in case of sensing a learning start of the learner; sensing, by a bio sensor module, a heart rate of the learner as a bio signal in response to the bio information collection request message; converting, by a bio information generation module, the bio signal sensed in the sensing step into bio information in a data form; and outputting, by the bio information generation module, a learning state analysis request message including the bio information to the learning state analysis device.

The collecting of the face recognition information may include: outputting, by a second control module, a face recognition information collection request message in case of sensing a learning start of the learner; generating, by a camera module, a learning video by filming the learner in response to the face recognition information collection request message; generating, by a face recognition information generation module, face recognition information by cropping an area in which a face of the learner is disposed from the learning video in response to the face recognition information collection request message; and outputting, by the face recognition information generation module, a learning state analysis request message including the face recognition information to the learning state analysis device.

The configuring of the learning state may include: detecting, by a collection module, the bio information from a learning state analysis request message; configuring, by a bio state configuration module, one of a plurality of bio steps as the bio state of the learner by comparing the bio information detected in the step of detecting the bio information with a plurality of analysis reference values; and outputting, by the bio state configuration module, a feedback configuration request message including the bio state configured in the configuring step.

The configuring of the bio step as the bio state may include: configuring the bio state of the learner as a fifth step if the heart rate that is the bio information is equal to or greater than a first heart rate set value; configuring the bio state of the learner as a fourth step if the heart rate is less than the first heart rate set value and equal to or greater than a second hear rate set value; configuring the bio state of the learner as a third step if the heart rate is less than the second heart rate set value and equal to or greater than a third heart rate set value; configuring the bio state of the learner as a second step if the heart rate is less than the third heart rate set value and equal to or greater than a fourth heart rate set value; and configuring the bio state of the learner as a first step if the heart rate is less than the fourth heart rate set value.

The configuring of the learning state may include: detecting, by a collection module, face recognition information from a learning state analysis request message; recognizing, by a learning focus configuration module, a learner's face in the face recognition information by performing face recognition with respect to the face recognition information; analyzing, by the learning focus configuration module, whether the learner is sleepy or leaves his/her seat by analyzing the learner's face; configuring, by the learning focus configuration module, the learning focus of the learner based on the face recognition information, and outputting a feedback configuration request message including the learning focus; and configuring one of first to fifth steps as the learning focus based on the result of analysis based on the face recognition information.

The outputting of the feedback control signal may include: transmitting, by feedback control module, a first feedback control signal for requesting a first sound source playback to the feedback device if the bio state of the learner is a fourth step; transmitting, by the feedback control module, a second feedback control signal for requesting the first sound source playback and an illuminance change to the feedback device if the bio state of the learner is a fifth step; transmitting, by the feedback control module, a third feedback control signal for requesting a first color lighting to the feedback device if the learning focus of the learner is a first step; transmitting, by the feedback control module, a fourth feedback control signal for requesting a second color lighting to the feedback device if the learning focus of the learner is a second step; transmitting, by the feedback control module, a fifth feedback control signal for requesting a third color lighting to the feedback device if the learning focus of the learner is a third step; transmitting, by the feedback control module, a sixth feedback control signal for requesting a fourth color lighting and incense spray to the feedback device if the learning focus of the learner is a fourth step; and transmitting, by the feedback control module, a seventh feedback control signal for requesting a fifth color lighting, incense spray, and a second sound source playback to the feedback device if the learning focus of the learner is a fifth step.

The outputting of the feedback may include: counting, by a learning focus time count module, a learning focus time based on the learning focus of the learner; and outputting, by a display module, the learning focus time being counted in the step of counting, wherein the counting starts the counting of a learning focus time if the learning focus is a first step or a second step, and ends the counting of the learning focus time if the learning focus is changed to one of third to fifth steps after starting the counting of the learning focus time.

Advantageous Effects

The system and the method for supporting learning according to the present disclosure have effects in that a specific feedback for directly solving the problem is provided through a separate device rather than stopping at the notification in case that the learning state of the learner has the problem, and thus the learner can be induced to perform an effective learning.

Further, according to the system and the method for supporting learning, the learner can intuitively monitor the learning state of the learner, and thus the learner can be induced to immediately improve the problem in the learning state of the learner in case that the learning state has the problem.

DESCRIPTION OF DRAWINGS

FIG. 1 is a diagram explaining a system for supporting learning according to an embodiment of the present disclosure.

FIG. 2 is a block diagram explaining the configuration of a bio information collection device of FIG. 1.

FIG. 3 is a block diagram explaining the configuration of a face recognition information collection device of FIG. 1.

FIG. 4 is a block diagram explaining the configuration of a learning state analysis device of FIG. 1.

FIGS. 5 and 6 are block diagrams explaining the configuration of a feedback device of FIG. 1.

FIG. 7 is a diagram explaining an operation of a feedback device of FIG. 1.

FIG. 8 is a diagram explaining a modified example of a system for supporting learning according to an embodiment of the present disclosure.

FIG. 9 is a flowchart explaining a method for supporting learning according to an embodiment of the present disclosure.

FIG. 10 is a flowchart explaining a bio information collection step of FIG. 9.

FIG. 11 is a flowchart explaining a face recognition information collection step of FIG. 9.

FIG. 12 is a flowchart explaining a learning state configuration step of FIG. 9.

FIGS. 13 and 14 are flowcharts explaining a feedback control signal output step of FIG. 9.

FIGS. 15 and 16 are flowcharts explaining a feedback output step of FIG. 9.

FIG. 17 is a flowchart explaining a modified example of a feedback output step of FIG. 9.

MODE FOR INVENTION

Hereinafter, preferred embodiments of the present disclosure will be described in detail with reference to the accompanying drawings.

Embodiments are provided to describe the present disclosure more completely to those of ordinary skill in the art, and the following embodiments may be modified in various different forms, and thus the scope of the present disclosure is not limited to the following embodiments. Rather, these embodiments are provided to make the present disclosure more faithful and complete and to completely transfer the idea of the present disclosure.

The terms used in the description are used to describe specific embodiments, and are not intended to limit the present disclosure. Further, in the description, unless clearly indicated otherwise in context, a singular form may include a plural form.

In describing the embodiments, in case that each layer (film), area, pattern, or structure is described to be formed "on" or "under" each substrate, layer (film), area, pad, or pattern, the terms "on" and "under" include both "direct" or "indirect" forming. Further, the criterion of "on" or "under" each layer is principally based on the drawings.

The drawings are merely to understand the idea of the present disclosure, and it should not be interpreted that the scope of the present disclosure is not limited by the drawings. Further, in the drawings, a relative thickness, length, or size may be exaggerated for convenience and accuracy of the description.

Referring to FIG. 1, a system for supporting learning according to an embodiment of the present disclosure is configured to include a bio information collection device 100, a face recognition information collection device 200, a learning state analysis device 300, and a feedback device 400.

The bio information collection device 100 collects bio information of a learner 10 during learning. The bio information collection device 100 is composed of a wearable device, such as a smart watch, worn by the learner 10. The bio information collection device 100 collects bio information that is the result of performing heart rate measurement or the like. The bio information collection device 100 generates a learning state analysis request message including a learner identifier and bio information, and transmits the learning state analysis request message to the learning state analysis device 300.

Referring to FIG. 2, the bio information collection device 100 is configured to include a first control module 120, a bio sensor module 140, and a bio information generation module 160.

The first control module 120 senses a learning start of the learner 10. The first control module 120 senses an input of a learning start message by the learner 10 as the learning start. In this case, the first control module 120 may sense the learning start if a collection start request message is received from the face recognition information collection device 200.

In case of sensing the learning start, the first control module 120 generates a bio information collection request message at predetermined time intervals, and transmits the bio information collection request message to the sensor module and the bio information generation module 160. The first control module 120 may transmit a collection start request message to the face recognition information collection device 200 sensing the learning start.

The bio sensor module 140 senses a bio signal of the learner 10 in response to the bio information collection request message of the first control module 120. The bio sensor module 140 outputs the sensed bio signal to the bio information generation module 160. The bio sensor module 140 may measure (sense) the bio information of the learner 10, such as a heart rate sensor. For example, the bio sensor module 140 is composed of a heart rate sensor that measures the heart rate of the learner 10, and outputs the bio signal corresponding to the sensed heart rate to the bio information generation module 160.

The bio information generation module 160 generates the bio information of the learner 10 based on the bio signal of the bio sensor module 140 in response to the bio information collection request message of the first control module 120. The bio information generation module 160 collects the bio signal of the bio sensor module 140, and converts the bio signal into bio information in a data form. For example, the bio information generation module 160 converts the heart rate bio signal of the bio sensor module into the heart rate that is the bio information.

The bio information generation module 160 generates a learning state analysis request message including the learner identifier and the bio information. In this case, the bio information generation module 160 preconfigure (pre-store) the learner identifier of the learner (i.e., owner) 10. The bio information generation module 160 transmits the learning state analysis request message to the learning state analysis device 300.

The face recognition information collection device 200 collects face recognition information of the learner 10 during learning. The face recognition information collection device 200 is composed of a device, such as a smart phone or tablet that is used by the learner 10 during the learning. The face recognition information collection device 200 may be composed of a separate device for face recognition. The face recognition information collection device 200 collects face recognition information that is the result of performing the face recognition of the learner 10. The face recognition information collection device 200 generates a learning state analysis request message including the learner identifier and the face recognition information, and transmits the learning state analysis request message to the learning state analysis device 300.

Referring to FIG. 3, the face recognition information collection device 200 is configured to include a second control module 220, a camera module 240, and a face recognition information generation module 260.

The second control module 220 senses the learning start of the learner 10. The second control module 220 senses an input of a learning start message by the learner 10 as the learning start. In this case, if the collection start request message of the bio information collection device 100 is received, the second control module 220 may sense this as the learning start.

In case of sensing the learning start, the second control module 220 generates a face recognition information collection request message, and transmits the face recognition information collection request message to the camera module 240 and the face recognition information generation module 260. In case of sensing the learning start, the second control module 220 may transmit a collection start request message to the bio information collection device 100.

The camera module 240 films the learner 10 and generates a learning video in response to the face recognition information collection request message of the second control module 220. The camera module 240 generates a face recognition information generation request message including the learning video, and transmits the face recognition information generation request message to the face recognition information generation module 260.

The face recognition information generation module 260 generates face recognition information in response to the face recognition information generation request message of the camera module 240. The face recognition information generation module 260 detects the learning video from the face recognition information generation request message. The face recognition information generation module 260 generates the face recognition information by cropping an area in which the face of the learner 10 is disposed from the learning video. The face recognition information generation module transmits the learning state analysis request message including the learner identifier and the face recognition information to the learning state analysis device 300.

The learning state analysis device 300 analyzes the learning state of the learner 10 in response to the learning state analysis request message of the bio information collection device 100 and/or the face recognition information collection device 200, and outputs a corresponding feedback control signal.

The learning state analysis device 300 analyzes the learning state of the learner 10 based on the face recognition information and the bio information included in the learning state analysis request message. The learning state analysis device 300 generates a feedback control signal based on the learning state, and transmits the feedback control signal to the feedback device 400. Here, for example, the feedback control signal is a signal for controlling the feedback being provided to the learner 10, such as lighting color change, incense spray, and music playback.

Referring to FIG. 4, the learning state analysis device 300 is configured to include a collection module 320, a bio state configuration module 340, a learning focus configuration module 360, and a feedback control module 380.

The collection module 320 detects the learner identifier and the bio information from the learning state analysis request message in response to the learning state analysis request of the bio information collection device 100. The collection module 320 generates the bio information analysis request message including the learner identifier and the bio information, and transmits the bio information analysis request message to the bio state configuration module 340.

The collection module 320 detects the learner identifier and the face recognition information from the learning state analysis request message in response to the learning state analysis request of the face recognition information collection device 200. The collection module 320 generates the face recognition information analysis request message including the learner identifier and the face recognition information, and transmits the face recognition information analysis request message to the learning focus configuration module 360.

The bio state configuration module 340 analyzes the bio state of the learner 10 in response to the bio information analysis request message of the collection module 320. The bio state configuration module 340 detects the learner identifier and the bio information from the bio information analysis request message. The bio state configuration module 340 configures one of a plurality of predetermined bio steps as the bio state of the learner 10 by comparing the bio information with a plurality of analysis reference values.

As an example, the bio state configuration module 340 configures one of "very good", "good", "normal", "bad", and "very bad" as the bio state of the learner 10 by comparing the heart rate that is the bio information with first to fourth heart rate set values. In this case, if the heart rate is equal to or greater than the first heart rate set value, the bio state configuration module 340 configures the bio state as "very bad". If the heart rate is less than the first heart rate set value and equal to or greater than the second heart rate set value, the bio state configuration module 340 configures the bio state as "bad". If the heart rate is less than the second heart rate set value and equal to or greater than the third heart rate set value, the bio state configuration module 340 configures the bio state as "normal". If the heart rate is less than the third heart rate set value and equal to or greater than the fourth heart rate set value, the bio state configuration module 340 configures the bio state as "good". If the heart rate is less than the fourth heart rate set value, the bio state configuration module 340 configures the bio state as "very good".

The bio state configuration module 340 generates a feedback configuration request message including the bio state after completing the bio state configuration of the leaner 10. The bio state configuration module 340 generates the feedback configuration request message including the learner identifier and the bio state. The bio state configuration module 340 transmits the feedback configuration request message to the feedback control module 380.

The learning focus configuration module 360 configures the learning focus of the learner 10 in response to the face recognition information analysis request message of the collection module 320. The learning focus configuration module 360 detects the learner identifier and the face recognition information from the face recognition information analysis request message.

The learning focus configuration module 360 recognizes the learner's face in the face recognition information (i.e., video) through the face recognition technology. The learning focus configuration module 360 analyzes the learning state of the learner 10, such as whether the learner 10 is sleepy or whether the learner 10 leaves his/her seat, by analyzing the recognized learner's face, and based on this, configures the learning focus. As an example, the learning focus configuration module 360 configures one of "very good", "good", "normal", "bad", and "very bad" as the learning focus through the face recognition.

The learning focus configuration module 360 generates a feedback configuration request message including the learning focus after completing the configuration of the learning focus. In this case, the learning focus configuration module 360 generates the feedback configuration request message including the learner identifier and the learning focus. The learning focus configuration module 360 transmits the feedback configuration request message to the feedback control module 380.

The feedback control module 380 generates the feedback control signal in response to the feedback configuration request message of the bio state configuration module 340 and/or the learning focus configuration module 360, and transmits the feedback control signal to the feedback device 400.

The feedback control module 380 generates the feedback control signal for controlling a feedback operation of the feedback device 400, such as a lighting color, illumination change, incense spray, music playback, and warning sound output in response to the feedback configuration request message.

The feedback control module 380 generates the feedback control signal for controlling the music playback and/or the illumination change of the feedback device 400 in response to the feedback configuration request message of the bio state configuration module 340.

The feedback control module 380 detects the learner identifier and the bio state from the feedback configuration request message. The feedback control module 380 generates the feedback control signal for controlling the music playback and/or illumination change based on the bio state. The feedback control module 380 transmits the feedback control signal to the feedback device 400.

As an example, if the detected bio state is one of "very good", "good", and "normal", the feedback control module 380 determines that the learner 10 is in a learning-focused state, and does not generate and transmit the feedback control signal.

If the detected bio state is "bad", the feedback control module 380 determines that the learner 10 is in a tensed state during learning, and transmits a first feedback control signal for requesting a first sound source playback for relieving the tension to the feedback device 400.

If the detected bio state is "very bad", the feedback control module 380 determines that the learner 10 is in a very tensed state during learning, and transmits a second feedback control signal for requesting the first sound source playback for relieving the tension and the illumination change to the feedback device 400.

The feedback control module 380 generates the feedback control signal for controlling the lighting color, incense spray, and a second sound source playback of the feedback device 400 in response to the feedback configuration request message of the learning focus configuration module 360.

The feedback control module 380 detects the learner identifier and the learning focus from the feedback configuration request message. The feedback control module 380 generates the feedback control signal for controlling the lighting color change, the incense spray, and the second sound source playback of the feedback device 400 based on the learning focus. The feedback control module 380 transmits the feedback control signal to the feedback device 400.

As an example, if the detected learning focus is "very good", the feedback control module 380 transmits, to the feedback device 400, a third feedback control signal for controlling the feedback device 400 to turn on the light with a first color.

If the detected learning focus is "good", the feedback control module 380 transmits, to the feedback device 400, a fourth feedback control signal for controlling the feedback device 400 to turn on the light with a second color.

If the detected learning focus is "normal", the feedback control module 380 transmits, to the feedback device 400, a fifth feedback control signal for controlling the feedback device 400 to turn on the light with a third color.

If the detected learning focus is "bad", the feedback control module 380 transmits, to the feedback device 400, a sixth feedback control signal for controlling the feedback device 400 to turn on the light with a fourth color and to spray the incense.

If the detected learning focus is "very bad", the feedback control module 380 transmits, to the feedback device 400, a seventh feedback control signal for controlling the feedback device 400 to turn on the light with a fifth color, to spray the incense, and to output the second sound source.

Here, the first color may be green, the second color may be light green, the third color may be yellow, the fourth color may be orange, and the fifth color may be red.

The feedback device 400 provides various types of feedback in accordance with the learning state to the learner 10 based on the feedback control signal of the learning state analysis device 300. That is, the feedback device 400 provides, to the learner 10, the feedback of the lighting color change, the incense spray, and the music playback, in accordance with the feedback control signal.

Referring to FIG. 5, the feedback device 400 is configured to include a feedback providing module 410, a light-emitting control module 420, a lamp module 425, a spray control module 430, a spray module 435, a sound source output module 440, and a speaker module 445.

The feedback providing module 410 transmits a control signal to the light-emitting control module 420, the spray control module 430, and the sound source output module 440 in response to the feedback control signal of the learning state analysis device 300.

That is, if a first feedback control signal is received from the learning state analysis device 300, the feedback providing module 410 transmits a sound source playback request message for requesting playback of a first sound source to the sound source output module 440.

If a second feedback control signal is received from the learning state analysis device 300, the feedback providing module 410 transmits the sound source playback request message for requesting the playback of the first sound source to the sound source output module 440, and transmits an illumination change request message for requesting a change to an illumination state for relaxation to the light-emitting control module 420.

If a third feedback control signal is received from the learning state analysis device 300, the feedback providing module 410 transmits a first color lighting request message for requesting a first color lighting to the light-emitting control module 420.

If a fourth feedback control signal is received from the learning state analysis device 300, the feedback providing module 410 transmits a second color lighting request message for requesting a second color lighting to the light-emitting control module 420.

If a fifth feedback control signal is received from the learning state analysis device 300, the feedback providing module 410 transmits a third color lighting request message for requesting a third color lighting to the light-emitting control module 420.

If a sixth feedback control signal is received from the learning state analysis device 300, the feedback providing module 410 transmits a fourth color lighting request message for requesting a fourth color lighting to the light-emitting control module 420.

If a seventh feedback control signal is received from the learning state analysis device 300, the feedback providing module 410 transmits a fifth color lighting request message for requesting a fifth color lighting to the light-emitting control module 420. The feedback providing module 410 transmits an incense spray request message for requesting an incense spray for focus improvement to the spray control module 430, and transmits a warning sound output request message for requesting an output of a warning sound to the sound source output module 440.

The light-emitting control module 420 outputs a lighting control signal for controlling a lighting color of the lamp module 425 in response to the lighting request message of the feedback providing module 410.

The light-emitting control module 420 controls the lamp module 425 to reduce illuminance for inducing relaxation of the learner 10 in response to the lighting change request message of the feedback control module 380. Accordingly, the lamp module 425 induces the relaxation of the learner 10 by slowly reducing the illuminance to predetermined illuminance.

The light-emitting control module 420 controls the lamp module 425 to turn on the light with a first color (i.e., green) in response to the first color lighting request of the feedback providing module 410. The light-emitting control module 420 controls the lamp module 425 to turn on the light with a second color (i.e., light green) in response to the second color lighting request of the feedback providing module 410. The light-emitting control module 420 controls the lamp module 425 to turn on the light with a third color (i.e., yellow) in response to the third color lighting request of the feedback providing module 410. The light-emitting control module 420 controls the lamp module 425 to turn on the light with a fourth color (i.e., orange) in response to the fourth color lighting request of the feedback providing module 410. The light-emitting control module 420 controls the lamp module 425 to turn on the light with a fifth color (i.e., red) in response to the fifth color lighting request of the feedback providing module 410. Accordingly, the lamp module 425 emits light with one of the first to fifth colors under the control of the light-emitting control module 420, and maintains the light emitting with the corresponding color until the next control.

The spray control module 430 controls the spray module 435 to spray the incense that helps the learner 10 to focus on the learning in response to the incense spray request message. Accordingly, the spray module 435 induces the learner 10 to focus on the learning or to relieve tension by spraying a pre-stored perfume in a space in which the learner 10 performs learning.

The sound source output module 440 outputs a sound source through the speaker module 445 in response to the request message of the feedback providing module 410. That is, the sound source output module 440 outputs a first sound source through the speaker module 445 in response to the sound source playback request message of the feedback providing module 410. The sound source output module 440 outputs a second sound source (e.g., warning sound) through the speaker module 445 in response to a warning sound output request message of the feedback providing module 410.

Through this, the feedback device 400 can identify the learning state of the learner 10 in real time, and enables the learner 10 to focus on the learning by providing illumination effects, various incenses, and music that help fundamental problem solving through analysis of the learning state of the learner.

Meanwhile, referring to FIG. 6, the feedback device 400 may further include a learning focus time count module 450 configured to count a learning focus time while the learner 10 focuses on the learning, and a display module 455 configured to display the learning focus time counted by the learning focus time count module 450.

The feedback providing module 410 generates a learning focus time count request message including learner identifiers and learning focuses, and transmits the learning focus time count request message to the learning focus time count module.

The learning focus time count module 450 counts the learning focus time that is the time while the learner 10 focuses on the learning in response to the learning focus time count request message of the feedback providing module 410. The learning focus time count module 450 detects the learning focus from the learning focus time count request message. If the learning focus is "very good" or "good", the learning focus time count module 450 starts counting of the learning focus time, and if the learning focus is changed to below "normal", the learning focus time count module 450 ends the counting of the learning focus time. Through this, the learning focus time count module 450 counts the learning focus time that is the time while the learning focus of the learner 10 is continuously maintained to be equal to or greater than "good".

The learning focus time count module 450 may count the learning focus time based on the light-emitting color of the lamp module 425 that emits light under the control of the light-emitting control module 420. That is, the learning focus time count module 450 starts the counting of the learning focus time if the lamp module 425 outputs the first color or the second color, and ends the counting of the learning focus time if the learning focus is the third color to the fifth color.

The learning focus time count module 450 transmits the learning focus time output request including the learning focus time to the display module 455.

Referring to FIG. 7, the display module 455 displays the learning focus time in response to the learning focus time output request of the learning focus time count module 450. In this case, the display module 455 displays, in real time, the learning focus time being counted by the learning focus time count module 450.

In the above embodiment, it is exemplified that the feedback providing device is installed in the space where the learner 10 performs learning, but as illustrated in FIG. 8, the feedback providing device may be installed in a space where a manager (teacher or parent) 20 who manages the learning of the learner 10, and may be configured to remotely monitor the learning state of the learner 10.

Hereinafter, a method for supporting learning according to an embodiment of the present disclosure will be described with reference to the accompanying drawings.

Referring to FIG. 9, the bio information collection device 100 collects bio information of a learner 10 during learning (S100). The bio information collection device 100 is composed of a wearable device, such as a smart watch, worn by the learner 10. The bio information collection device 100 collects bio information that is the result of performing heart rate measurement or the like. The bio information collection device 100 generates a learning state analysis request message including a learner identifier and bio information, and transmits the learning state analysis request message to the learning state analysis device 300.

Referring to FIG. 10, the first control module 120 senses a learning start of the learner 10. The first control module 120 senses an input of a learning start message by the learner 10 as the learning start. In this case, the first control module 120 may sense the learning start if a collection start request message is received from the face recognition information collection device 200. In case of sensing the learning start (Yes in S110), the first control module 120 generates a bio information collection request message at predetermined time intervals, and transmits the bio information collection request message to the sensor module and the bio information generation module 160 (S120).

The bio sensor module 140 senses a bio signal of the learner 10 in response to the bio information collection request message of the first control module 120 (S130). The bio sensor module 140 outputs the sensed bio signal to the bio information generation module 160. In this case, the bio sensor module 140 is composed of a module that can measure (sense) the bio information of the learner 10, such as a heart rate sensor. For example, the bio sensor module 140 is composed of a heart rate sensor that measures the heart rate of the learner 10, and outputs the bio signal corresponding to the sensed heart rate to the bio information generation module 160.

The bio information generation module 160 generates the bio information of the learner 10 based on the bio signal of the bio sensor module 140 in response to the bio information collection request message of the first control module 120 (S140). That is, the bio information generation module 160 collects the bio signal of the bio sensor module 140, and converts the bio signal into bio information in a data form. For example, the bio information generation module 160 converts the heart rate bio signal of the bio sensor module into the heart rate that is the bio information.

The bio information generation module 160 generates a learning state analysis request message including the learner identifier and the bio information, and transmits the learning state analysis request message to the learning state analysis device 300 (S150). In this case, the bio information generation module 160 preconfigure (pre-store) the learner identifier of the learner (i.e., owner) 10.

The face recognition information collection device 200 collects face recognition information of the learner 10 during learning. The face recognition information collection device 200 is composed of a device, such as a smart phone or a tablet that is used by the learner 10 during the learning. The face recognition information collection device 200 may be composed of a separate device for face recognition. The face recognition information collection device 200 collects face recognition information that is the result of performing the face recognition of the learner 10. The face recognition information collection device 200 generates a learning state analysis request message including the learner identifier and the face recognition information, and transmits the learning state analysis request message to the learning state analysis device 300.

Here, in FIG. 9, it is illustrated that the step S200 is performed after the step S100, but is not limited thereto. The steps S100 and S200 may be simultaneously performed, or the step S100 may be performed after the step S200.

Referring to FIG. 11, the second control module 220 senses the learning start of the learner 10. The second control module 220 senses an input of a learning start message by the learner 10 as the learning start. In case of sensing as the learning start (Yes in S210), the second control module 220 generates and transmits a face recognition information collection request message to the camera module 240 and the face recognition information generation module 260 (S220).

The camera module 240 films the learner 10 and generates a learning video in response to the face recognition information collection request message of the second control module 220 (S230). The camera module 240 generates a face recognition information generation request message including the learning video, and transmits the face recognition information generation request message to the face recognition information generation module 260.

The face recognition information generation module 260 generates face recognition information in response to the face recognition information generation request message of the camera module 240 (S240). The face recognition information generation module 260 detects the learning video from the face recognition information generation request message. The face recognition information generation module 260 generates the face recognition information by cropping an area in which the face of the learner 10 is disposed from the learning video.

The face recognition information generation module transmits the learning state analysis request message including the learner identifier and the face recognition information to the learning state analysis device 300 (S250).

The learning state analysis device 300 configures the learning state of the learner 10 based on the bio information and the face recognition information in response to the learning state analysis request message of the bio information collection device 100 and/or the face recognition information collection device 200 (S300). The learning state analysis device 300 analyzes the learning state of the learner 10 based on the face recognition information and the bio information included in the learning state analysis request message.

Referring to FIG. 12, the collection module 320 detects the learner identifier and the bio information from the learning state analysis request message in response to the learning state analysis request of the bio information collection device 100 (S310). The collection module 320 generates the bio information analysis request message including the learner identifier and the bio information, and transmits the bio information analysis request message to the bio state configuration module 340.

The bio state configuration module 340 configures one of a plurality of predetermined bio steps as the bio state of the learner 10 by comparing the bio information detected from the bio information analysis request message with a plurality of analysis reference values in response to the bio information analysis request message of the configuration module (S320). As an example. the bio state configuration module 340 configures one of "very good", "good", "normal", "bad", and "very bad" as the bio state of the learner 10 by comparing the heart rate that is the bio information with first to fourth heart rate set values. In this case, if the heart rate is equal to or greater than the first heart rate set value, the bio state configuration module 340 configures the bio state as "very good". If the heart rate is less than the first heart rate set value and equal to or greater than the second heart rate set value, the bio state configuration module 340 configures the bio state as "good". If the heart rate is less than the second heart rate set value and equal to or greater than the third heart rate set value, the bio state configuration module 340 configures the bio state as "normal". If the heart rate is less than the third heart rate set value and equal to or greater than the fourth heart rate set value, the bio state configuration module 340 configures the bio state as "bad". If the heart rate is less than the fourth heart rate set value, the bio state configuration module 340 configures the bio state as "very bad".

The bio state configuration module 340 generates a feedback configuration request message including the bio state after completing the bio state configuration of the leaner 10. After completing the bio state configuration of the learner 10, the bio state configuration module 340 generates the feedback configuration request message including the learner identifier and the bio state, and transmits the feedback configuration request message to the feedback control module 380 (S330).

The collection module 320 detects the learner identifier and face recognition information from the learning state analysis request message in response to the learning state analysis request of the face recognition information collection module 320 (S340). The collection module 320 generates a face recognition information analysis request message including the learner identifier and the face recognition information, and transmits the face recognition information analysis request message to the learning focus configuration module 360.

The learning focus configuration module 360 recognizes the learner's face in the face recognition information (i.e., video) detected from the face recognition information analysis request message through the face recognition technology in response to the face recognition information analysis request message of the face recognition information collection device 200.

The learning focus configuration module 360 analyzes the state of the learner 10, such as whether the learner 10 is sleepy or whether the learner 10 leaves his/her seat, by analyzing the recognized learner's face (S360).

The learning focus configuration module 360 configures the learning focus based on the result of the analysis in the step S360 (S370). As an example, the learning focus configuration module 360 configures one of "very good", "good", "normal", "bad", and "very bad" as the learning focus through the face recognition.

The learning focus configuration module 360 generates a feedback configuration request message including the learner identifier and the learning focus after completing the configuration of the learning focus, and transmits the feedback configuration request message to the feedback control module 380 (S380).

Here, in FIG. 12, it is illustrated that the steps S340 to S380 are performed after the steps S310 to S330, but are not limited thereto. The steps S310 to S330 and the steps S340 to S380 may be simultaneously performed.

In the step S300, the learning state analysis device 300 generates a feedback control signal based on the learning state configured in the step S300, and transmits the feedback control signal to the feedback device 400 (S400). That is, the feedback control module 380 generates the feedback control signal based on the learning state of the learner in response to the feedback configuration request message of the bio state configuration module 340 and/or the learning focus configuration module 360, and transmits the feedback control signal to the feedback device 400. In this case, the feedback control module 380 generates the feedback control signal for controlling the feedback operation, such as a lighting color, illumination change, incense spray, music playback, and warning sound output, of the feedback device 400 in response to the feedback configuration request message.

Referring to FIGS. 13 and 14, if the bio state detected from the feedback configuration request message is "bad" (S405), the feedback control module 380 determines that the learner 10 is in a tensed state during learning, and transmits a first feedback control signal for requesting a first sound source playback for relieving the tension to the feedback device 400 (S410).

If the bio state detected from the feedback configuration request message is "very bad" (Yes in S415), the feedback control module 380 determines that the learner 10 is in a very tensed state during the learning, and transmits a second feedback control signal for requesting the first sound source playback and the illumination change for relieving the tension to the feedback device 400 (S420).

If the learning focus detected from the feedback configuration request message is "very good" (Yes in S425), the feedback control module 380 transmits, to the feedback device 400, a third feedback control signal for controlling the feedback device 400 to turn on the light with a first color (S430). Here, it is exemplified that the first color is green.

If the learning focus detected from the feedback configuration request message is "good" (Yes in S435), the feedback control module 380 transmits, to the feedback device 400, a fourth feedback control signal for controlling the feedback device 400 to turn on the light with a second color (S440). Here, it is exemplified that the second color is light green.

If the learning focus detected from the feedback configuration request message is "normal" (Yes in S445), the feedback control module 380 transmits, to the feedback device 400, a fifth feedback control signal for controlling the feedback device 400 to turn on the light with a third color (S450). Here, it is exemplified that the third color is yellow.

If the learning focus detected from the feedback configuration request message is "bad" (Yes in S455), the feedback control module 380 transmits, to the feedback device 400, a sixth feedback control signal for controlling the feedback device 400 to turn on the light with a fourth color and to spray the incense (S460). Here, it is exemplified that the fourth color is orange.

If the learning focus detected from the feedback configuration request message is "very bad" (Yes in S465), the feedback control module 380 transmits, to the feedback device 400, a seventh feedback control signal for controlling the feedback device 400 to turn on the light with a fifth color, to spray the incense, and to output the second sound source (S470). Here, it is exemplified that the fifth color is red.

The feedback device 400 provides various types of feedback in accordance with the learning state to the learner 10 based on the feedback control signal of the learning state analysis device 300 (S500). That is, the feedback device 400 provides, to the learner 10, the feedback, such as the lighting color change, the incense spray, and the music playback, in accordance with the feedback control signal.

Referring to FIGS. 15 and 16, if the first feedback control signal is received from the learning state analysis device 300 (Yes in S511), the feedback providing module 410 transmits a sound source playback request message for requesting playback of the first sound source to the sound source output module 440 (S512).

If a second feedback control signal is received from the learning state analysis device 300 (Yes in S521), the feedback providing module 410 transmits the sound source playback request message for requesting the playback of the first sound source to the sound source output module 440 (S522).

The sound source output module 440 outputs the first sound source through the speaker module 445 in response to the sound source playback request message of the feedback providing module 410 (S523).

The feedback providing module 410 transmits an illumination change request message for requesting the change to an illumination state for relaxation to the light-emitting control module 420 (S524).

The light-emitting control module 420 controls the lamp module 425 to reduce the illuminance in order to induce the relaxation of the learner 10 in response to the illumination change request message of the feedback control module 380. Accordingly, the lamp module 425 induces the relaxation of the learner 10 by slowly reducing the illuminance to the predetermined illuminance (S525).

If a third feedback control signal is received from the learning state analysis device 300 (Yes in S531), the feedback providing module 410 transmits a first color lighting request message for requesting a first color lighting to the light-emitting control module 420 (S532).

The light-emitting control module 420 controls the lamp module 425 to turn on the light with the first color (i.e., green) in response to the first color lighting request of the feedback providing module 410 (S533).

If a fourth feedback control signal is received from the learning state analysis device 300 (Yes in S541), the feedback providing module 410 transmits a second color lighting request message for requesting a second color lighting to the light-emitting control module 420 (S542).

The light-emitting control module 420 controls the lamp module 425 to turn on the light with the second color (i.e., light green) in response to the second color lighting request of the feedback providing module 410 (S543).

If a fifth feedback control signal is received from the learning state analysis device 300 (Yes in S551), the feedback providing module 410 transmits a third color lighting request message for requesting a third color lighting to the light-emitting control module 420 (S552).

The light-emitting control module 420 controls the lamp module 425 to turn on the light with the third color (i.e., yellow) in response to the third color lighting request of the feedback providing module 410 (S553).

If a sixth feedback control signal is received from the learning state analysis device 300 (Yes in S561), the feedback providing module 410 transmits a fourth color lighting request message for requesting a fourth color lighting to the light-emitting control module 420 (S562).

The light-emitting control module 420 controls the lamp module 425 to turn on the light with the fourth color (i.e., orange) in response to the second color lighting request of the feedback providing module 410 (S563).

The feedback providing module 410 transmits an incense spray request message for requesting the incense spray for focus improvement to the spray control module 430 (S564).

The spray control module 430 controls the spray module 435 to spray the incense that helps the learner 10 to focus on the learning in response to the incense spray request message of the feedback providing module 410. Accordingly, the spray module 435 induces the learner 10 to focus on the learning or to relieve the tension by spraying a pre-stored perfume into a space where the learner 10 performs the learning (S565)

If a seventh feedback control signal is received from the learning state analysis device 300 (Yes in S571), the feedback providing module 410 transmits a fifth color lighting request message for requesting a fifth color lighting to the light-emitting control module 420 (S572).

The light-emitting control module 420 controls the lamp module 425 to turn on the light with a fifth color (i.e., red) in response to the fifth color lighting request of the feedback providing module 410 (S573).

The feedback providing module 410 transmits an incense spray request message for requesting an incense spray for focus improvement to the spray control module 430 (S574).

The spray control module 430 controls the spray module 435 to spray the incense that helps the learner 10 to focus on the learning in response to the incense spray request message of the feedback providing module 410. Accordingly, the spray module 435 induces the learner 10 to focus on the learning or to relieve the tension by spraying a pre-stored perfume into a space where the learner 10 performs the learning (S575)

The feedback providing module 410 transmits a warning sound output request message for requesting an output of a warning sound to the sound source output module 440 (S576).

The sound source output module 440 outputs a second sound source (i.e., warning sound) through the speaker module 445 in response to the warning sound output request message of the feedback providing module 410 (S578).

The feedback output step S500 may further include: counting the learning focus time and displaying the learning focus time.

Referring to FIG. 17, the feedback providing module 410 generates a learning focus time count request message including learner identifiers and learning focuses, and transmits the learning focus time count request message to the learning focus time count module (S581).

The learning focus time count module 450 detects the learning focus from the learning focus time count request message in response to the learning focus time count request message of the feedback providing module 410 (S582).

If the learning focus is "very good" or "good" (Yes in S583), the learning focus time count module 450 starts counting of the learning focus time (S584).

If the learning focus is changed to below "normal" (Yes in S585), the learning focus time count module 450 ends the counting of the learning focus time (S586). Through this, the learning focus time count module 450 counts the learning focus time that is the time while the learning focus of the learner 10 is continuously maintained to be equal to or greater than "good".

The learning focus time count module 450 transmits the learning focus time output request including the learning focus time to the display module 455 (S587).

Meanwhile, in the step S580, the learning focus time count module 450 may count the learning focus time based on the light-emitting color of the lamp module 425 that emits light under the control of the light-emitting control module 420. That is, if the lamp module 425 outputs the first color or the second color, the learning focus time count module 450 starts the counting of the learning focus time, and if the learning focus outputs the third to fifth colors, the learning focus time count module 450 ends the counting of the learning focus time.

The display module 455 displays the learning focus time in response to the learning focus time output request of the learning focus time count module 450 (S590). In this case, the display module 455 displays, in real time, the learning focus time being counted by the learning focus time count module 450.

The above explanation of the present disclosure is merely for exemplary explanation of the technical idea of the present disclosure, and it can be understood by those of ordinary skill in the art to which the present disclosure pertains that various corrections and modifications thereof will be possible in a range that does not deviate from the essential characteristics of the present disclosure. Accordingly, it should be understood that the embodiments disclosed in the present disclosure are not to limit the technical idea of the present disclosure, but to explain the same, and thus the scope of the technical idea of the present disclosure is not limited by such embodiments. The scope of the present disclosure should be interpreted by the appended claims to be described later, and all technical ideas in the equivalent range should be interpreted as being included in the scope of the present disclosure.

DESCRIPTION OF REFERENCE NUMERALS

| | |
|---|---|
| 100: bio information collection device | 120: first control module |
| 140: bio sensor module | 160: bio information generation module |
| 200: face recognition information collection device | |
| 220: second control module | 240: camera module |
| 260: face recognition information generation module | |
| 300: learning state analysis device | 320: collection module |
| 340: bio state configuration module | 360: learning focus configuration module |
| 380: feedback control module | 400: feedback device |
| 410: feedback providing module | 420: light-emitting control module |
| 425: lamp module | 430: spray control module |
| 435: spray module | 440: sound source output module |
| 445: speaker module | 450: learning focus time count module |
| 455: display module | |

The invention claimed is:

1. A system for supporting learning comprising:

a bio information collection device configured to: collect bio information of a learner during learning, and output a learning state analysis request message including the bio information;

a face recognition information collection device configured to: collect face recognition information of the learner, and output a learning state analysis request message including the face recognition information;

a learning state analysis device configured to: configure a bio state of the learner based on the bio information detected from the learning state analysis request message in response to the learning state analysis request message of the bio information collection device, configure a learning focus of the learner based on the face recognition information detected from the learning state analysis request message in response to the learning state analysis request message of the face recognition information collection device, and output a feedback control signal based on a learning state including the bio state and the learning focus; and a feedback device configured to output at least one feedback among a lighting color change, an illuminance change, an incense spray, and a sound source playback in response to the feedback control signal of the learning state analysis device, and wherein the learning state analysis device comprises:

a collection module configured to: output a bio information analysis request message including the bio information detected from the learning state analysis request message in response to the learning state analysis request message of the bio information collection device, and output a face recognition information analysis request message including the face recognition information detected from the learning state analysis request message in response to the learning state analysis request message of the face recognition information collection device;

a bio state configuration module configured to: configure one of a plurality of bio steps as the bio state of the learner by comparing the bio information detected from the bio information analysis request message with a plurality of analysis reference values in response to the bio information analysis request message of the collection module, and output a feedback configuration request message including the bio state;

a learning focus configuration module configured to: configure a learning focus of the learner based on the face recognition information detected from the face recognition information analysis request message in response to the face recognition information analysis request message of the collection module, and output a feedback configuration request message including the learning focus; and a feedback control module configured to output, to the feedback device, a feedback control signal for controlling at least one feedback operation among the lighting color change, the illuminance change, the incense spray, and the sound source playback in response to at least one feedback configuration request message between the bio state configuration module and the learning focus configuration module.

2. The system of claim 1, wherein the bio information collection device comprises:

a first control module configured to output a bio information collection request message in case of sensing a learning start of the learner;

a bio sensor module configured to: sense a bio signal of the learner in response to the bio information collection request message of the first control module, sense a heart rate of the learner as the bio signal through being composed of a heart rate sensor, and output the bio signal; and a bio information generation module configured to: convert the bio signal output from the bio sensor module into bio information in a data form in response to the bio information collection request message of the first control module, and output the learning state analysis request message including the bio information to the learning state analysis device.

3. The system of claim 1, wherein the face recognition information collection device comprises:

a second control module configured to output a face recognition information collection request message in case of sensing a learning start of the learner;

a camera module configured to: generate a learning video by filming the learner in response to the face recognition information collection request message of the second control module, and output a face recognition information generation request message including the learning video; and a face recognition information generation module configured to: detect the learning video from the face recognition information generation request message of the camera module in response to the face recognition information collection request message of the second control module, generate face recognition information by cropping an area in which a face of the learner is disposed from the learning video, and output a learning state analysis request message including the face recognition information to the learning state analysis device.

4. The system of claim 1, wherein the bio state configuration module is configured to: configure first to fourth heart rate set values, and configure the bio state of the learner by comparing a heart rate that is the bio information with the first to fourth heart rate set values, and wherein the bio state configuration module is configured to: configure the bio state of the learner as a fifth step if the heart rate is equal to or greater than the first heart rate set value, configure the bio state of the learner as a fourth step if the heart rate is less than the first heart rate set value and equal to or greater than the second hear rate set value, configure the bio state of the learner as a third step if the heart rate is less than the second heart rate set value and equal to or greater than the third heart rate set value, configure the bio state of the learner as a second step if the heart rate is less than the third heart rate set value and equal to or greater than the fourth heart rate set value, and configure the bio state of the learner as a first step if the heart rate is less than the fourth heart rate set value.

5. The system of claim 1, wherein the learning focus configuration module is configured to: recognize a learner's face in the face recognition information by performing face recognition with respect to the face recognition information, analyze whether the learner is sleepy or leaves his/her seat by analyzing the learner's face, configure the learning focus based on the result of analysis, and configure one of the first to fifth steps as the learning focus of the learner.

6. The system of claim 1, wherein the feedback control module is configured to:

transmit a first feedback control signal for requesting a first sound source playback to the feedback device if the bio state of the learner is a fourth step, transmit a second feedback control signal for requesting the first sound source playback and an illuminance change to the feedback device if the bio state of the learner is a fifth step, transmit a third feedback control signal for requesting a first color lighting to the feedback device if the learning focus of the learner is a first step, transmit a fourth feedback control signal for requesting a second color lighting to the feedback device if the learning focus of the learner is a second step, transmit a fifth feedback control signal for requesting a third color lighting to the feedback device if the learning focus of the learner is a third step, transmit a sixth feedback control signal for requesting a fourth color lighting and incense spray to the feedback device if the learning focus of the learner is a fourth step, and transmit a seventh feedback control signal for requesting a fifth color lighting, incense spray, and a second sound source playback to the feedback device if the learning focus of the learner is a fifth step.

7. The system of claim 1, wherein the feedback device comprises:

a light-emitting control module configured to control a lamp module to control a lighting color and lighting illuminance of a lamp in response to the feedback control signal;

a spray control module configured to control a spray module to spray incense into a space in which the learner is located in response to the feedback control signal;

a sound source output module configured to output one of a first sound source and a second sound source into the space in which the learner is located through a speaker module in response to the feedback control signal; and a feedback providing module configured to provide at least one feedback among a lighting color change, an illuminance change, an incense spray, and a sound source playback to the learner by outputting the feedback control signal to at least one of the light-emitting control module, the spray control module, and the sound source output module in response to the feedback control signal of the learning state analysis device.

8. The system of claim 7, wherein the feedback device further comprises:

a learning focus time count module configured to: count a learning focus time based on the learning focus of the learner, output a learning focus time output request after starting counting of the learning focus time if the learning focus is a first step or a second step, and end the counting of the learning focus time if the learning focus is changed to one of third to fifth steps after starting the counting of the learning focus time; and a display module configured to display the learning focus time being counted by the learning focus time count module in response to the learning focus time output request of the learning focus time count module.

9. A method for supporting learning comprising:

collecting, by a bio information collection device, bio information of a learner during learning;

collecting, by a face recognition information collection device, face recognition information of the learner;

configuring, by a learning state analysis device, a learning state including a bio state of the learner configured based on the bio information collected in the step of collecting the bio information and face recognition information collected in the step of collecting the face recognition information;

outputting, by the learning state analysis device, a feedback control signal based on the learning state configured in the step of configuring the learning state; and outputting, by a feedback device, at least one feedback among a lighting color change, an illuminance change, an incense spray, and a sound source playback in response to the feedback control signal, and wherein the configuring of the learning state comprises:

detecting, by a collection module, the bio information from a learning state analysis request message;

configuring, by a bio state configuration module, one of a plurality of bio steps as the bio state of the learner by comparing the bio information detected in the step of detecting the bio information with a plurality of analysis reference values; and outputting, by the bio state configuration module, a feedback configuration request message including the bio state configured in the configuring step.

10. The method of claim 9, wherein the collecting of the bio information comprises:

outputting, by a first control module, a bio information collection request message in case of sensing a learning start of the learner;

sensing, by a bio sensor module, a heart rate of the learner as a bio signal in response to the bio information collection request message;

converting, by a bio information generation module, the bio signal sensed in the sensing step into bio information in a data form; and outputting, by the bio information generation module, a learning state analysis request message including the bio information to the learning state analysis device.

11. The method of claim 9, wherein the collecting of the face recognition information comprises:

outputting, by a second control module, a face recognition information collection request message in case of sensing a learning start of the learner;

generating, by a camera module, a learning video by filming the learner in response to the face recognition information collection request message;

generating, by a face recognition information generation module, face recognition information by cropping an area in which a face of the learner is disposed from the learning video in response to the face recognition information collection request message; and outputting, by the face recognition information generation module, a learning state analysis request message including the face recognition information to the learning state analysis device.

12. The method of claim 9, wherein the configuring of the bio step as the bio state comprises:

configuring the bio state of the learner as a fifth step if the heart rate that is the bio information is equal to or greater than a first heart rate set value;

configuring the bio state of the learner as a fourth step if the heart rate is less than the first heart rate set value and equal to or greater than a second hear rate set value;

configuring the bio state of the learner as a third step if the heart rate is less than the second heart rate set value and equal to or greater than a third heart rate set value;

configuring the bio state of the learner as a second step if the heart rate is less than the third heart rate set value and equal to or greater than a fourth heart rate set value; and configuring the bio state of the learner as a first step if the heart rate is less than the fourth heart rate set value.

13. The method of claim 9, wherein the configuring of the learning state further comprises:

detecting, by a collection module, face recognition information from a learning state analysis request message;

recognizing, by a learning focus configuration module, a learner's face in the face recognition information by performing face recognition with respect to the face recognition information;

analyzing, by the learning focus configuration module, whether the learner is sleepy or leaves his/her seat by analyzing the learner's face;

configuring, by the learning focus configuration module, the learning focus of the learner based on the face recognition information, and outputting a feedback configuration request message including the learning focus; and configuring one of first to fifth steps as the learning focus based on the result of analysis based on the face recognition information.

14. The method of claim 9, wherein the outputting of the feedback control signal comprises:

transmitting, by feedback control module, a first feedback control signal for requesting a first sound source playback to the feedback device if the bio state of the learner is a fourth step;

transmitting, by the feedback control module, a second feedback control signal for requesting the first sound source playback and an illuminance change to the feedback device if the bio state of the learner is a fifth step;

transmitting, by the feedback control module, a third feedback control signal for requesting a first color lighting to the feedback device if the learning focus of the learner is a first step;

transmitting, by the feedback control module, a fourth feedback control signal for requesting a second color lighting to the feedback device if the learning focus of the learner is a second step;

transmitting, by the feedback control module, a fifth feedback control signal for requesting a third color lighting to the feedback device if the learning focus of the learner is a third step;

transmitting, by the feedback control module, a sixth feedback control signal for requesting a fourth color lighting and incense spray to the feedback device if the learning focus of the learner is a fourth step; and transmitting, by the feedback control module, a seventh feedback control signal for requesting a fifth color lighting, incense spray, and a second sound source playback to the feedback device if the learning focus of the learner is a fifth step.

15. The method of claim 9, wherein the outputting of the feedback comprises:

counting, by a learning focus time count module, a learning focus time based on the learning focus of the learner; and outputting, by a display module, the learning focus time being counted in the step of counting, and wherein the counting starts the counting of a learning focus time if the learning focus is a first step or a second step, and ends the counting of the learning focus time if the learning focus is changed to one of third to fifth steps after starting the counting of the learning focus time.

* * * * *